(12) United States Patent
Mizuta et al.

(10) Patent No.: US 10,328,370 B2
(45) Date of Patent: Jun. 25, 2019

(54) NON-WOVEN FILTRATION MATERIAL AND AIR CLEANER ELEMENT

(71) Applicant: TIGERS POLYMER CORPORATION, Osaka (JP)

(72) Inventors: Shinsuke Mizuta, Hyogo (JP); Shota Umemoto, Hyogo (JP)

(73) Assignee: TIGERS POLYMER CORPORATION, Osaka (JP)

( * ) Notice: Subject to any disclaimer, the term of this patent is extended or adjusted under 35 U.S.C. 154(b) by 253 days.

(21) Appl. No.: 15/382,948

(22) Filed: Dec. 19, 2016

(65) Prior Publication Data

US 2017/0173510 A1 Jun. 22, 2017

(30) Foreign Application Priority Data

Dec. 21, 2015 (JP) .................................. 2015-248142

(51) Int. Cl.
*B01D 59/50* (2006.01)
*B01D 39/16* (2006.01)
*F02M 35/024* (2006.01)
*H01M 8/0662* (2016.01)

(52) U.S. Cl.
CPC ... *B01D 39/1623* (2013.01); *F02M 35/02458* (2013.01); *H01M 8/0687* (2013.01); *B01D 2239/0216* (2013.01); *B01D 2239/064* (2013.01); *B01D 2239/065* (2013.01); *B01D 2239/0618* (2013.01); *B01D 2239/0636* (2013.01); *B01D 2239/1233* (2013.01); *B01D 2239/1291* (2013.01); *H01M 2250/20* (2013.01); *Y02T 90/32* (2013.01)

(58) Field of Classification Search
CPC .... B01D 39/04; B01D 39/14; B01D 39/1623; B01D 2239/64–65; B01D 2239/216; B01D 2239/442; B01D 2239/618; B01D 2239/636
See application file for complete search history.

(56) References Cited

U.S. PATENT DOCUMENTS 5,597,645 A * 1/1997 Pike .................... B01D 39/1623
210/243
5,622,772 A * 4/1997 Stokes ...................... D01F 8/06
428/369

(Continued)

FOREIGN PATENT DOCUMENTS

JP 2005-349389 12/2005

*Primary Examiner* — Amber R Orlando
*Assistant Examiner* — Phillip Y Shao
(74) *Attorney, Agent, or Firm* — Rankin, Hill & Clark LLP

(57) ABSTRACT

Provided is a non-woven filtration material including a multilayer structure having a density gradient. The multilayer structure includes a coarse layer disposed at an upstream side of the non-woven filtration material and a dense layer disposed at a downstream side of the non-woven filtration material. The coarse layer and the dense layer are dry layers. The coarse layer contains 30% to 60% by weight of crimped conjugated fibers and contains 30% to 70% by weight of finer fibers. The crimped conjugated fibers have an average fiber diameter in a range from 15 μm to 45 μm. The finer fibers have an average fiber diameter that is in a range from 5 μm to 20 μm and smaller than the average fiber diameter of the conjugated fibers.

6 Claims, 1 Drawing Sheet

(56) References Cited

U.S. PATENT DOCUMENTS

| | | | |
|---|---|---|---|
| 7,655,070 B1* | 2/2010 | Dallas | B01D 39/04 |
| | | | 210/502.1 |
| 2008/0085398 A1* | 4/2008 | Yasui | A41B 17/00 |
| | | | 428/152 |
| 2009/0165223 A1* | 7/2009 | Braunecker | D04H 1/555 |
| | | | 8/444 |
| 2009/0165235 A1* | 7/2009 | Yasumitsu | B32B 29/02 |
| | | | 15/209.1 |
| 2011/0189915 A1* | 8/2011 | Morimoto | D01D 5/22 |
| | | | 442/353 |

* cited by examiner

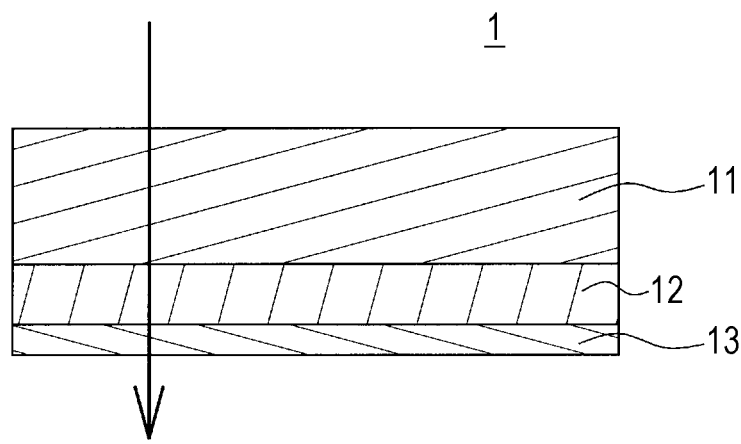
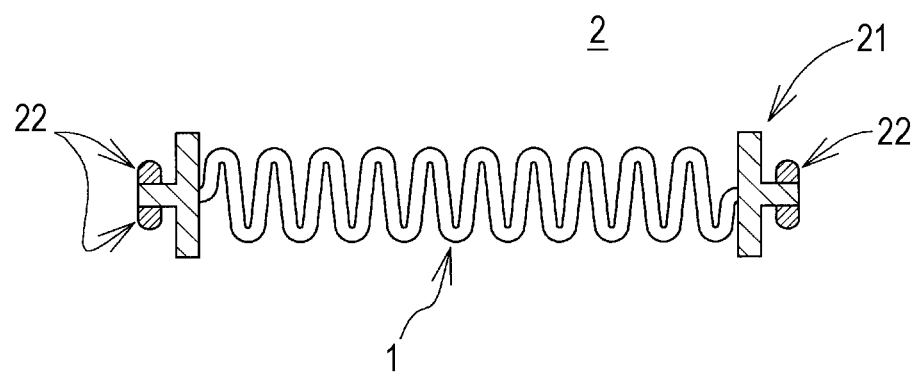

NON-WOVEN FILTRATION MATERIAL AND AIR CLEANER ELEMENT

CROSS-REFERENCE TO RELATED APPLICATION

This application is based on Japanese Patent Application No. 2015-248142 filed with the Japan Patent Office on Dec. 21, 2015, the entire content of which is hereby incorporated by reference.

BACKGROUND

1. Technical Field

The present disclosure relates to a non-woven filtration material and an air cleaner element using a non-woven filtration material.

2. Related Art

A non-woven filtration material is used for air filtration as a filtration material for air cleaners applied for, for example, an internal combustion engine and a fuel cell, which are used for an automobile and the like. In such an application, there is a demand for effectively removing fine dust from a large amount of air. In addition, the non-woven filtration material is required to have a high cleaning efficiency, a long life with which dust can be removed for a long period without causing clogging, and compactness with which a sufficient filtration performance can be exerted within a limited space.

Particularly in recent years, the air filters are required to improve the performance of removing particulate dust such as carbon dust. If particulate dust, such as carbon dust, cannot be fully removed, the dust is accumulated on a detection device, such as a flow sensor, which is disposed at the downstream side of the filtration material (filter element). This may result in insufficient accuracy and stability of the output of the detection device.

In the structure of a multilayer filter element of a typically-known non-woven filtration material, particulate dust, such as carbon dust, is often captured by a layer containing fibers having a small diameter and having a highest bulk density. Accordingly, when the carbon dust is captured, the pressure loss of the filtration material is likely to increase and the life of the filtration material is shortened. In particular, when the particulate dust capture efficiency (cleaning efficiency) is increased by, for example, increasing the bulk density of a dense layer, clogging of the filtration material is more likely to occur. In other words, in the filtration of particulate dust using the non-woven filtration material, there is a trade-off relationship between the cleaning efficiency and the life of the filtration material.

For example, JP-A-2005-349389 discloses a non-woven filtration material including a plurality of non-woven fabric layers which is not impregnated with oil. This non-woven filtration material is formed in such a manner that the porosity of the non-woven fabric layer disposed at the upstream side of the non-woven filtration material is smaller than the porosity of the non-woven fabric layer disposed at the downstream side of the non-woven filtration material. JP-A-2005-349389 also discloses that the porosity of the non-woven fabric layer disposed at the downstream side of the non-woven filtration material is in a range from 85% to 92%; the average fineness of the fibers contained in the non-woven fabric layer disposed at the downstream side of the non-woven filtration material is 3 decitex or less; and the average fineness of the fibers contained in the non-woven fabric layer disposed at the upstream side of the non-woven filtration material is 3 decitex or more. According to the non-woven filtration material, dust permeation due to intake pulsation is prevented. Accordingly, an advantageous effect that the carbon dust cleaning efficiency and the carbon dust retaining amount can be favorably maintained is obtained.

CITATION LIST

Patent Literature

Patent Literature 1: JP-A-2005-349389

SUMMARY

A non-woven filtration material according to an embodiment of the present disclosure includes a multilayer structure having a density gradient. The multilayer structure includes a coarse layer disposed at an upstream side of the non-woven filtration material and a dense layer disposed at a downstream side of the non-woven filtration material. The coarse layer and the dense layer are dry layers. The coarse layer contains 30% to 60% by weight of crimped conjugated fibers and contains 30% to 70% by weight of finer fibers. The crimped conjugated fibers have an average fiber diameter in a range from 15 μm to 45 μm. The finer fibers have an average fiber diameter that is in a range from 5 μm to 20 μm and smaller than the average fiber diameter of the conjugated fibers.

BRIEF DESCRIPTION OF THE DRAWINGS

FIG. 1 is a schematic diagram showing a sectional structure of a non-woven filtration material according to a first embodiment of the present disclosure; and FIG. 2 is a schematic diagram showing a structure of an air cleaner element using a non-woven filtration material.

DETAILED DESCRIPTION

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Even the non-woven filtration material disclosed in JP-A-2005-349389 has a limitation in capturing a large amount of particulate dust, such as carbon dust, with a high cleaning efficiency. Accordingly, there is a demand for a filtration material having a higher capture efficiency and a longer life.

Various attempts have been made to form non-woven fabric using ultra fine fibers favorable for capturing particulate dust. However, in the non-woven fabric using ultra fine fibers as obtained by a general-purpose melt-blown method, the ultra fine fibers are arranged in a planar manner. Accordingly, it is difficult to produce a thick non-woven fabric having a three-dimensional structure by the melt-blown method. Thus, even if the ultra fine fibers are used, it is still difficult to solve the trade-off relationship between the cleaning efficiency and the life of the filtration material in the filtration of particulate dust.

An object of the present disclosure is to provide a non-woven filtration material capable of having a particulate dust capture performance (cleaning efficiency) and a long life in a balanced manner. Another object of the present disclosure is to provide a non-woven filtration material which is suitable for air filtration and used for an internal combustion engine of an automobile and for a fuel cell of an automobile.

As a result of earnest study, the present inventors have found that when a specific amount of crimped conjugated fibers having a specific large diameter and a specific amount of finer fibers having a specific small diameter are blended in a coarse layer, which is disposed at the upstream side of a non-woven filtration material having a multilayer structure having a density gradient, the particulate dust capture performance in the coarse layer is improved, which makes it possible to solve the above-mentioned problem. Thus, the present disclosure has been completed.

A first embodiment of the present disclosure is a non-woven filtration material including a multilayer structure having a density gradient. The multilayer structure includes a coarse layer disposed at an upstream side of the non-woven filtration material and a dense layer disposed at a downstream side of the non-woven filtration material. The coarse layer and the dense layer are dry layers. The coarse layer contains 30% to 60% by weight of crimped conjugated fibers and contains 30% to 70% by weight of finer fibers. The crimped conjugated fibers have an average fiber diameter in a range from 15 μm to 45 μm. The finer fibers have an average fiber diameter that is in a range from 5 μm to 20 μm and smaller than the average fiber diameter of the conjugated fibers.

In the first embodiment, preferably, in the finer fibers contained in the coarse layer, finer fibers including a low-melting-point component and having a core-sheath structure are preferably blended (second embodiment). Further, in the second embodiment, the blending ratio of the finer fibers including the low-melting-point component and having the core-sheath structure in the finer fibers contained in the coarse layer is preferably in a range from 40% to 80% by weight (third embodiment).

Another embodiment of the present disclosure is an air cleaner element (fourth embodiment) for an internal combustion engine of an automobile or for a fuel cell of an automobile, the air cleaner element including any one of the non-woven filtration materials of the first to third embodiments.

In the first embodiment, crimped conjugated fibers and finer fibers are blended at a specific blending ratio in the coarse layer, so that the finer fibers are three-dimensionally arranged in the coarse layer. The three-dimensionally arranged finer fibers contribute to an improvement in the performance of capturing particulate dust such as carbon dust. The non-woven filtration material according to this embodiment provides an advantageous effect that the particulate dust capture performance (cleaning efficiency) and the life of the filtration material can be increased in a balanced manner.

In the non-woven filtration material of the second embodiment, finer fibers including a low-melting-point component and having a core-sheath structure are blended. Accordingly, the airflow performance can also be improved. Further, when the blending ratio of the finer fibers including the low-melting-point component and having the core-sheath structure is determined as in the third embodiment, the airflow performance and the life of the filtration material to filter particulate dust can be further increased in a balanced manner. Further, in the air cleaner element of the fourth embodiment, the particulate dust capture performance (cleaning efficiency) and the life of the filtration material can be increased in a balanced manner, and thus the air cleaner element can be preferably used for an internal combustion engine and a fuel cell of an automobile.

Embodiments of the present disclosure will be described below with reference to the accompanying drawings, as examples of the non-woven filtration material that can be used as a filtration material for an air cleaner for filtering air supplied to an internal combustion engine (engine) of an automobile. The embodiments of the present disclosure are not limited to the following individual embodiments. These embodiments can be modified as appropriate.

FIG. 1 is a schematic diagram showing a sectional structure of a non-woven filtration material 1 according to a first embodiment of the present disclosure. The non-woven filtration material of the first embodiment is a sheet-like non-woven fabric. When this non-woven filtration material is used for an air cleaner for an automobile engine, the non-woven filtration material is generally used as an air cleaner element 2 which is fixed to a frame in a pleated-sheet state. FIG. 2 is a sectional view schematically showing the structure of the air cleaner element. The air cleaner element 2 includes the non-woven filtration material 1, a frame body 21, and seal members 22. The non-woven filtration material 1 is formed into a pleated-sheet, the non-woven filtration material 1 is integrated with the frame body 21 that surrounds the non-woven filtration material 1. The seal members 22 are provided around the frame body 21. A publicly known structure is employed as a specific structure of the air cleaner element. This specific structure is not limited thereto. The structure of the air cleaner element 2 need not necessarily include the frame body 21 and the seal members 22.

The non-woven filtration material 1 is a non-woven filtration material having a multilayer structure including a plurality of laminated non-woven fabric layers. As is seen from an arrow, which indicates an airflow in FIG. 1, when the non-woven filtration material is used, a layer to be used at the upstream side of the filtration material and a layer to be used at the downstream side of the filtration material are determined in advance in the non-woven filtration material. The non-woven filtration material 1 includes a coarse layer 11 which is disposed at the upstream side of the filtration material, and a dense layer 12 which is disposed at the downstream side of the filtration material. The coarse layer 11 has a non-woven fabric layer bulk density lower than that of the dense layer 12. In other words, the coarse layer 11 has a non-woven fabric layer porosity higher than that of the dense layer 12. That is, the non-woven filtration material 1 includes the coarse layer 11, which is disposed at the upstream side of the filtration material, and the dense layer 12, which is disposed at the downstream side of the filtration material, and also has a density gradient.

The non-woven fabric layer porosity described herein refers to the value indicating, by percentage, the spatial volume of the non-woven fabric layer per unit volume (a volume obtained by subtracting the volume of fibers from the volume of the entire non-woven fabric layer). A coarse non-woven fabric layer indicates that the layer has a large porosity. A dense non-woven fabric layer indicates that the layer has a small porosity. The porosity of the coarse layer 11 is preferably about 90% to 99%. The porosity of the dense layer 12 is preferably about 80% to 95%. In the first embodiment, the porosity of the coarse layer 11 is set to 99.6%, and the porosity of the dense layer 12 is set to 93.5%.

The areal weight (basis weight) of the non-woven fabric layer in the coarse layer 11 and the dense layer 12 of the non-woven filtration material is not particularly limited. Preferably, the areal weight of the coarse layer 11 is about 40 to 200 g/square meters, and the areal weight of the dense layer 12 is about 70 to 300 g/square meters. In this embodiment, the areal weight of the coarse layer 11 is 75 g/square meters, and the areal weight of the dense layer 12 is 125 g/square meters.

The non-woven filtration material 1 may include layers other than the coarse layer 11 and the dense layer 12. For example, a pre-filter layer may be provided at the upstream side of the coarse layer 11. Alternatively, an intermediate layer may be provided between the coarse layer 11 and the dense layer 12. In another alternative, a base material layer 13 may be provided at the downstream side of the dense layer 12. The formation of these layers is not indispensable. In the non-woven filtration material 1 of this embodiment, the base material layer 13 is provided at the downstream side of the dense layer 12. The base material layer 13 mainly plays the role of increasing the production efficiency of the non-woven filtration material 1.

Each of the coarse layer 11 and the dense layer 12 is disposed as a dry layer. The dry layer is a layer including a non-woven fabric layer that is substantially neither impregnated nor coated with oil. Particulate dust, such as carbon dust, is captured mainly by the coarse layer 11 and the dense layer 12 of the non-woven filtration material 1. When a so-called viscous type filter element is impregnated with oil and these layers are impregnated with the oil, particulate dust is likely to pass through the layers. Accordingly, each of the coarse layer 11 and the dense layer 12 is used as the dry layer.

Layers other than the coarse layer 11 and the dense layer 12 are not necessarily dry layers. Instead, a viscous layer impregnated with oil may be used. For example, the viscous layer may be disposed at the upstream side of the coarse layer. When a part of the layers of the non-woven filtration material 1 is the viscous layer, it is preferable to prevent the contamination by oil and the transfer of oil so that the coarse layer 11 and the dense layer 12 are reliably used as the dry layer.

The structure of the coarse layer 11 will be described in more detail. In the non-woven filtration material 1, the coarse layer 11 has a role of capturing most of the particulate dust. The coarse layer 11 is a non-woven fabric layer containing a plurality of types of fibers which have different fiber thicknesses and are blended. The coarse layer 11 contains crimped conjugated fibers having an average fiber diameter in a range from 15 µm to 45 µm and finer fibers having an average fiber diameter in a range from 5 µm to 20 µm and having a fiber diameter smaller than that of the conjugated fiber.

The conjugated fibers and finer fibers are intermingled with each other and three-dimensionally arranged in the coarse layer 11. The intermingled state of the conjugated fibers and finer fibers is maintained by a friction between fibers, adhesion with binder, or adhesive fibers (such as so-called low-melting-point fibers). As the conjugated fibers and finer fibers, long continuous fibers or short fibers may be used. From the viewpoint of easier blending and a smaller amount of falling off fibers from the non-woven fabric, it is preferable to adjust the length of the fibers to about 30 to 80 mm and to form these fibers into non-woven fabric.

The average fiber diameter of the fibers will now be described. When one type of fibers that are made of one type of material is used, the average fiber diameter refers to the fiber diameter obtained by an arithmetic calculation from the fineness and material density of the fiber. Assuming that the fibers have a circular cross section, the average fiber diameter of the fibers is calculated directly from the fineness of the fibers, as represented by denier or decitex, and the density of material constituting the fibers. When a plurality of types of fibers are used as a group of fibers whose average fiber diameter is to be calculated, or when the fibers are made of a plurality of structural materials, the average fiber diameter is calculated for each fiber and structural material from the fineness and density. The weighted average of the average fiber diameters calculated according to the blending ratio of the fibers and the structural material of the fibers can be treated as the average fiber diameter. Further, when the fibers have a deformed section or a hollow structure, the width of the fibers is measured at a plurality of sections in a microscope photograph image of the fibers. The calculated width arithmetic average can be treated as the average fiber diameter of the fibers.

The crimped conjugated fibers contained in the coarse layer 11 will be described. The conjugated fibers refer to fibers formed by a combination of a plurality of materials having different types or characteristics of materials. Examples of the conjugated fibers include conjugated fibers (so-called conjugate fibers) which have an eccentric structure or a side-by-side structure and are obtained by simultaneously extruding (co-extruding) resins having different thermal shrinkage percentages, and bi-component fibers obtained by a combination of fibers having different thermal shrinkage percentages. The conjugated fibers are blended in the coarse layer 11 in a crimped state. When the conjugated fibers are crimped, the crimped form of the fibers generally has a three-dimensional crimped structure. Typical examples of the three-dimensional crimped structure are coil-shaped and spiral-shaped three-dimensional crimped forms. However, the crimped form is not limited to these examples. Hollow conjugated fibers may also be used as the conjugated fibers. When the conjugated fibers are hollow, the crimped state is maintained favorably and more firmly.

A typical example of the material used for the conjugated fibers is a chemical fiber material. However, a fiber material obtained by combining natural fibers and chemical fibers may be used. Typical examples of the chemical fiber material to be used include polyester resins such as polyethylene terephthalate (PET) resins, polyamide resins such as nylon 6, acrylic resins such as polyacrylonitrile resins, and polyolefin resins such as polypropylene resins.

In this embodiment, conjugated fibers having an average fiber diameter of 26.8 µm are used as crimped conjugated fibers. The conjugated fibers are obtained by adding crimps by performing a heat treatment on the conjugated fibers conjugated by a side-by-side structure including a polyester resin and a polyester-based resin.

The finer fibers contained in the coarse layer 11 will be described. The finer fibers are blended in the coarse layer. Thus, particulate dust is attached to the surface of the finer fibers. Accordingly, the coarse layer 11 can effectively capture particulate dust. To effectively capture particulate dust, the average fiber diameter of the finer fibers contained in the coarse layer 11 is set to 5 µm to 20 µm. Further, the average fiber diameter of the finer fibers is set to be smaller than the average fiber diameter of the conjugated fibers. With this structure, in the coarse layer 11, the bulky three-dimensional structure of the coarse layer is maintained by the crimped conjugated fiber. Further, in the coarse layer 11, particulate dust is captured mainly by the finer fibers.

Natural fibers can be used as the finer fibers contained in the coarse layer 11. However, synthetic fibers are preferably used. Examples of the synthetic fibers include fibers produced using raw resin materials such as polyesters such as PET (Polyethylene terephthalate), PBT (polybutylene terephthalate), and PTT (polytrimethylene terephthalate), polyolefins such as PP (polypropylene) and PE (polyethylene), PA (polyamide) such as 6-nylon and 66-nylon, and polyacrylic, and rayon fibers. These synthetic fibers are blended in the coarse layer 11 singly or in combination with other fibers. As the finer fibers contained in the coarse layer 11, finer fibers including a low-melting-point component and having a core-sheath structure (so-called low-melting-point fibers containing a high-melting-point component as a core and containing a low-melting-point component as a sheath) may be contained so that the thermal bonding method can be used. The performance of capturing particulate dust may be enhanced by performing an electret treatment or an oil-repellent treatment on the finer fibers contained in the coarse layer 11.

In this embodiment, as the finer fibers contained in the coarse layer 11, regular PET fibers having an average fiber diameter of 11.6 µm and PET fibers which has an average fiber diameter of 14.3 µm, includes a low-melting-point component, and has a core-sheath structure are used.

The blending ratio of the fibers in the coarse layer 11 of the non-woven filtration material 1 is set to contain 30% to 60% by weight of conjugated fibers and 30% to 70% by weight of finer fibers. When the ratio of conjugated fibers is 30% by weight or more and the ratio of finer fibers is 70% by weight or less, the finer fibers are three-dimensionally arranged in the coarse layer 11, instead of being arranged in a squashed planar manner. When the ratio of the finer fibers is 30% by weight or more, the coarse layer can capture a large amount of particulate dust. The blending ratio of the fibers in the coarse layer 11 is preferably set in such a manner that the ratio of the conjugated fibers is 40% to 50% by weight and the ratio of the finer fibers is 40% to 60% by weight.

As the finer fibers contained in the coarse layer 11, when the finer fibers including the low-melting-point component and having the core-sheath structure are blended, the blending ratio of the finer fibers including the low-melting-point component and having the core-sheath structure in the finer fibers contained in the coarse layer 11 is preferably 40% to 80% by weight, and particularly preferably 50% to 70% by weight. When the blending ratio is 40% by weight or more, the three-dimensional arrangement of the fibers contained in the coarse layer is favorably maintained. When the blending ratio is 80% by weight or less, the finer fibers are favorably dispersed uniformly in the entire coarse layer.

In this embodiment, the coarse layer 11 contains 45% by weight of crimped conjugated fibers, 20% by weight of regular PET fibers as finer fibers contained in the coarse layer 11, and 30% by weight of PET fibers, which include a low-melting-point component and have a core-sheath structure, as finer fibers. In addition, the coarse layer 11 contains 5% by weight of regular PET fibers having an average fiber diameter of 24.7 µm.

The structure of the dense layer 12 will be described in detail. In the non-woven filtration material 1, the dense layer 12 has a role of capturing particulate dust which has passed through the coarse layer 11. In consideration of this role, a structure suitable for capturing particulate dust is preferably employed for the dense layer 12. For example, the fibers contained in the dense layer 12 have an average fiber diameter of, preferably, 5 µm to 30 µm, and particularly preferably 5 µm to 20 µm. Materials similar to the finer fibers contained in the coarse layer 11 can be used as the material of the fibers contained in the dense layer. Thick fibers may be mixed so as to prevent the fiber arrangement structure of the dense layer from being squashed. Note that the particulate dust capture efficiency (cleaning efficiency) can be enhanced by forming the dense layer 12 with finer fibers and increasing the bulk density (reducing the porosity). However, since the dense layer is likely to be clogged with particulate dust, the life of the filtration material is likely to be shortened.

In this embodiment, the dense layer 12 contains 40% by weight of regular PET fibers having an average fiber diameter of 17.5 µm and 60% by weight of regular PET fibers having an average fiber diameter of 11.6 µm.

A method for producing the non-woven filtration material 1 according to the first embodiment will be described. The non-woven filtration material 1 is produced by a non-woven fabric producing method including a first step and a second step. In the first step, fiber aggregates (a web or non-woven fabric) to constitute the coarse layer 11, the dense layer 12, and the base material layer 13 are laminated. In the second step, needle-punch, water-flow interlacing treatment, heat treatment, or binder treatment is performed on the laminated body, thereby integrating the laminated bodies. This producing method is publicly known.

In the first step, first, the raw material fibers to be contained in the coarse layer are opened and blended, and subjected to a measuring process and a fiber supply process, thereby obtaining a web to become the coarse layer. The raw material fibers to be contained in the dense layer are similarly opened and blended and subjected to the measuring process and the fiber supply process, thereby obtaining a web to become the dense layer. The base material layer may be produced from a web. Also, a spunbond non-woven fabric produced in advance may be used as the base material layer. Next, on the spunbond non-woven fabric serving as the base material layer, the web for the dense layer and the web for the coarse layer are laminated in this order. Thus, the first step is completed.

Next, the obtained laminated body is subjected to a needle-punch process. In this process, each layer is controlled to have a predetermined porosity, and the laminated body is integrated. Subsequent to the needle-punch process, the integrated laminated body is preferably dipped in a binder liquid and subjected to a heat treatment, so that the intersections between fibers are fixed (second step). Through this integration process, the non-woven filtration material 1 is obtained. The timing of crimping the crimped conjugated fibers contained in the coarse layer 11 is not particularly limited. The process of crimping the conjugated fibers may be carried out prior to the opening and blending process of the first step, or in parallel to the opening and blending process of the first step. Alternatively, the conjugated fibers may be crimped in the needle-punch process or the heat treatment process of the second step.

The action and effect of the non-woven filtration material 1 according to the embodiment will be described.

In the non-woven filtration material 1, the coarse layer 11 is a dry layer. The coarse layer 11 contains crimped conjugated fibers having an average fiber diameter of 15 µm to 45 µm and finer fibers having an average fiber diameter of 5 µm to 20 µm and having a fiber diameter smaller than that of the conjugated fibers. In the coarse layer 11, the blending ratio of the conjugated fibers is 30% to 60% by weight and the blending ratio of the finer fibers is 30% to 70% by weight, which allows the coarse layer to capture a large amount of particulate dust, such as carbon dust, with a high capture efficiency (cleaning efficiency).

The related-art multilayer structure non-woven fabric as disclosed in JP-A-2005-349389 is designed in such a manner that the coarse layer disposed at the upstream side captures a large amount of relatively coarse dust such as JIS-8 type dust. The technical idea of capturing particulate dust by the coarse layer disposed at the upstream side is not disclosed. In the multilayer non-woven fabric of the related art, particulate dust is captured exclusively by the dense layer containing finer fibers. However, it is difficult for the finer fibers contained in the dense layer to maintain the three-dimensional arrangement and a high porosity of the fibers while resisting against the airflow passing through the filtration material. Thus, the arrangement of the fibers in the dense layer is likely to be squashed and the planar fiber arrangement structure is likely to be formed. Accordingly, in the related art, an increase in the efficiency of capturing particulate dust causes clogging soon. Specifically, it has been difficult to achieve both the particulate dust capture efficiency (cleaning efficiency) and a long life of the filtration material.

In the non-woven filtration material 1 according to the embodiment, relatively thick crimped conjugated fibers and relatively thin finer fibers are blended in the coarse layer. Further, a large amount of particulate dust can be effectively captured by the finer fibers, while the crimped conjugated fibers maintain the three-dimensional fiber arrangement of the coarse layer. To enable capture of a large amount of particulate dust with a high efficiency, the blending ratio of the fibers in the coarse layer 11 is set in such a manner that 30% to 60% by weight of conjugated fibers having a specific thickness are contained and 30% to 70% by weight of finer fibers having a specific thickness are contained.

In particular, in the coarse layer 11, the three-dimensional arrangement of the finer fibers is effectively achieved by a combination of crimped conjugated fibers and the finer fibers. This is because the crimped conjugated fibers are often crimped to a so-called coil-shaped or spiral-shaped three-dimensional crimped form, and the finer fibers are caught in such three-dimensional crimped structure and interlaced with each other, which prevents the three-dimensional structure of the finer fibers from being easily squashed. Since the three-dimensional arrangement of the finer fibers is effectively achieved, particulate dust is attached to the finer fibers in the whole coarse layer 11. Accordingly, the volume filtration of particulate dust in the coarse layer 11 is achieved. As a result, a long life of the filtration material can be achieved, while capturing particulate dust with a high capture efficiency.

Further, when finer fibers including the low-melting-point component and having the core-sheath structure are blended in the finer fibers blended in the coarse layer 11, the low-melting-point component is melted by performing a heat treatment on the core-in-sheath fiber, thereby making it possible to fix the intersections between the fibers in the coarse layer. With this structure, the three-dimensional arrangement of the finer fibers contained in the coarse layer is prevented from being squashed due to an airflow. Accordingly, the airflow performance of the non-woven filtration material is enhanced (i.e., the airflow resistance of the filtration material decreases).

Further, the finer fibers contained in the coarse layer are preferably blended in such a manner that the blending ratio of the finer fibers including the low-melting-point component and having the core-sheath structure is 40% to 80% by weight. In this case, when the blending ratio is 40% by weight or more, the three-dimensional arrangement of the fibers constituting the coarse layer can be maintained more favorably. When the blending ratio is 80% by weight or less, the finer fibers are likely to be dispersed uniformly in the entire coarse layer. The airflow performance and the life of the filtration material for filtering particulate dust are increased in a balanced manner, and the both airflow performance and long life of the filtration material can be achieved.

Further, the non-woven filtration material 1 can be favorably used for an air cleaner for filtering air to be supplied to an internal combustion engine of an automobile, or for an air cleaner for filtering air to be supplied to a fuel cell of an automobile. These air cleaners need to be provided with a compact air cleaner element. Accordingly, the air filtration material is used at a relatively high passing flow rate. As a result, the filtration material is required to have a particularly strict performance. Also in the application in which the strict performance is required, the non-woven filtration material 1 can capture a large amount of particulate dust with a high efficiency. Accordingly, the non-woven filtration material 1 can be used for these air cleaner elements.

EXAMPLES

Examples of the present disclosure will be described below. The embodiments of the present disclosure are not limited by these examples.

The specification, such as the material, thickness, and areal weight amount of the fibers and the density gradient between the laminated layers, of the filtration materials used in the following Examples and Comparative Examples is substantially the same as the specification of the filtration material used in other examples, unless otherwise stated. The shapes and pleated-sheet specifications of the filter elements formed for tests in Examples and Comparative Examples are the same. The fiber specification and performance evaluation results of Examples and Comparative Examples are shown in Table 1.

TABLE 1

|  |  |  | Example 1 | Example 2 | Example 3 | Comparative Example 1 | Comparative Example 2 | Comparative Example 3 |
| --- | --- | --- | --- | --- | --- | --- | --- | --- |
| Coarse layer | Thick fiber | Crimped conjugated fiber | 45 | 45 | 45 | 0 | 100 | 0 |
|  |  | R-PET | 5 | 5 | 5 | 100 | 0 | 50 |
|  | Finer fiber | R-PET | 20 | 50 | 35 | 0 | 0 | 50 |
|  |  | L-PET (core-in-sheath) | 30 | 0 | 15 | 0 | 0 | 0 |
| Dense layer |  | R-PET blending | ← | ← | ← | ← | ← | ← |
| Effect Rating |  | Particulate dust cleaning efficiency | 12 | 12 | 12 | 10 | 10 | 11 |
|  |  | Particulate dust life | 15 | 14 | 14 | 10 | 11 | 11 |
|  |  | Airflow performance | 11 | 9 | 10 | 10 | 10 | 9 |

Example 1

Example 1 is the non-woven filtration material 1 described as the first embodiment. The areal weight of the coarse layer 11 is 75 g/square meters, and the porosity thereof is 96.6%. The areal weight of the dense layer 12 is 125 g/square meters, and the porosity thereof is 93.5%. As the base material layer 13, spunbond non-woven fabric having an areal weight of 15 g/square meters was used.

As the thick fiber component of the coarse layer 11, 45% by weight of crimped conjugated fibers made of a polyethylene terephthalate resin and having an average fiber diameter of 26.8 μm (fineness of 7.8 decitex) are contained and 5% by weight of regular fibers made of a polyethylene terephthalate resin (R-PET: regular PET fibers other than conjugated fibers) having an average fiber diameter of 24.7 μm (fineness of 6.6 decitex) are contained.

As the finer fiber components of the coarse layer 11, 20% by weight of regular fibers made of a polyethylene terephthalate resin (R-PET: regular PET fibers other than core-in-sheath fibers) having an average fiber diameter of 11.6 μm (fineness of 1.45 decitex) are contained and 30% by weight of fibers (L-PET) including the low-melting-point component and having the core-sheath structure that have an average fiber diameter of 14.3 μm (fineness of 2.2 decitex) and are made of a polyethylene terephthalate resin are contained.

Accordingly, in the finer fibers contained in the coarse layer 11, the blending ratio of the finer fibers (L-PET) including the low-melting-point component and having the core-sheath structure is 60% by weight.

As the fiber components of the dense layer 12, 40% by weight of regular fibers made of a polyethylene terephthalate resin and having an average fiber diameter of 17.5 μm (fineness of 3.3 decitex) are contained and 60% by weight of regular fibers made of a polyethylene terephthalate resin and having an average fiber diameter of 11.6 μm (fineness of 1.45 decitex) are contained.

A binder treatment of 40 g/square meters is performed on the dense layer.

Example 2

A non-woven filtration material was used which has the same structure as Example 1 except that 50% by weight of regular fibers made of polyethylene terephthalate resin having an average fiber diameter of 11.6 μm (fineness of 1.45 decitex) are contained as finer fiber components in the coarse layer; while fibers (L-PET) including the low-melting-point component and having the core-sheath structure are not contained.

Example 3

A non-woven filtration material was used which has the same structure as Example 1 except that 35% by weight of regular fibers made of polyethylene terephthalate resin having an average finer fiber diameter of 11.6 μm (fineness of 1.45 decitex) are contained as finer fiber components in the coarse layer, and 15% by weight of fibers including the low-melting-point component and having the core-sheath structure having an average fiber diameter 14.3 μm (fineness of 2.2 decitex) and made of polyethylene terephthalate resin are contained as finer fiber components in the coarse layer.

Comparative Example 1

A non-woven filtration material was used which has the same structure as that of Example 1 except that, as the thick fiber components of the coarse layer, 100% by weight of regular fibers made of a polyethylene terephthalate resin and having an average fiber diameter of 24.7 μm (fineness of 6.6 decitex) are contained and that the coarse layer contains no finer fibers.

Comparative Example 2

A non-woven filtration material was used which has the structure as Example 1 except that, as the thick fiber components of the coarse layer, 100% by weight of crimped conjugated fibers made of a polyethylene terephthalate resin and having an average fiber diameter of 26.8 μm (fineness of 7.8 decitex) are contained and that the coarse layer contains no finer fibers.

Comparative Example 3

A non-woven filtration material was used which has the same structure as that of Example 1 except that, as the thick fiber components of the coarse layer, 50% by weight of regular fibers made of a polyethylene terephthalate resin and having an average fiber diameter of 24.7 μm (fineness of 6.6 decitex) are contained, while the crimped conjugated fibers are not contained, and that, as the finer fiber component, 50% by weight of regular fibers made of a polyethylene terephthalate resin and having an average fiber diameter of 11.6 μm (fineness of 1.45 decitex) are contained.

Experiments: Evaluation of Filtration Performance for Particulate Dust (Carbon Dust)

The obtained non-woven filtration material was formed to have a pleated-sheet structure. A frame body was attached to the formed non-woven filtration material to thereby provide the obtained air cleaner element for tests. A full-life cleaning efficiency (capture efficiency) test, a dust capture amount test, and an airflow resistance test were conducted on carbon dust in accordance with JISD1612 (automobile air cleaner test method) using air cleaner elements. The test conditions are shown below.

Filtration material effective filtration area: 0.18 square meters
Test dust: carbon dust (light oil burning carbon)
Dust supply amount: carbon dust (0.10 g/min)
Test flow rate: 4.2 cubic meters/min
Airflow resistance: a differential pressure between upstream and downstream of the filtration material (at the time of starting the test)

It is determined that the air cleaner element has reached a full life when the increased airflow resistance reaches 2.94 kPa. The amount of dust captured from the start of the test until the full life was measured as a full-life capture amount.

Table 1 shows the test results by rating. The rating represents, at stepwise levels, the degree of improvement/deterioration in each performance on the basis of the test value of Comparative Example 1 as the base performance level (10 points). Higher points indicate that the non-woven filtration materials used for the tests have a more preferable performance (higher cleaning efficiency, an increase in the full-life capture amount of particulate dust (increased life), and a decreased airflow resistance).

For example, an increase in the rating of the cleaning efficiency from 10 to 12 indicates an improvement of in the cleaning efficiency from 75% to 85%.

An increase in the rating of the particulate dust life from 10 to 15 indicates that the full-life capture amount of fine particles was increased by 1.5-fold.

An increase in the rating of the airflow performance from 10 to 11 indicates an improvement of about 5% in the airflow resistance of the filtration material.

In each Example, unlike in Comparative Example 1, the rating of the cleaning efficiency for cleaning particulate dust and the life of the filtration material is greatly improved. This indicates that the cleaning efficiency and the life can be improved as a result of solving the trade-off relationship between the cleaning efficiency and the life of the filtration material. Comparative Example 2 using the crimped conjugated fibers and Comparative Example 3 in which the coarse layer contains finer fibers do not show any remarkable improvement in performance, and do not show any improvement in the cleaning efficiency and the life of the filtration material, unlike in the examples of the present disclosure. From this fact, it can be understood that a significant improvement in the cleaning efficiency and the life of the filter element is achieved in each example due to the synergistic action by a combination of the crimped conjugated fibers in the coarse layer and the finer fibers blended in the coarse layer.

Examples 1, 2, and 3 have different amounts of finer fibers including the low-melting-point component and having the core-sheath structure in the coarse layer. It is understood that the finer fibers including the low-melting-point component and having the core-sheath structure are blended in the coarse layer, thereby effectively enhancing the airflow performance. Further, a large amount of finer fibers including the low-melting-point component and having the core-sheath structure are preferably blended in the coarse layer, and more preferably the finer fibers are blended in the finer fibers contained in the coarse layer in such a manner that the blending ratio of the finer fibers including the low-melting-point component and having the core-sheath structure exceeds 40% by weight (corresponding to Example 1), which makes it possible to improve the airflow performance and the life of the filter member in a balanced manner.

The following first to third non-woven filtration materials may be used as the non-woven filtration material according to the present disclosure, and the following air cleaner element may be used as the air cleaner element according to the present disclosure.

The first non-woven filtration material is a non-woven filtration material having a multilayer structure which has a density gradient and includes a coarse layer disposed at the upstream side and a dense layer disposed at the downstream side. The coarse layer and the dense layer are dry layers, and the coarse layer contains crimped conjugated fibers having an average fiber diameter in a range from 15 µm to 45 µm and finer fibers having an average fiber diameter of 5 to 20 µm and a fiber diameter smaller than that of the conjugated fiber. The ratio of conjugated fibers blended in the coarse layer is in a range from 30% to 60% by weight, and the ratio of finer fibers blended in the coarse layer is in a range from 30% to 70% by weight.

The second non-woven filtration material is the first non-woven filtration material in which finer fibers including a low-melting-point component and having a core-sheath structure are blended in the finer fibers contained in the coarse layer.

The third non-woven filtration material is the second non-woven filtration material in which the ratio of blended finer fibers including a low-melting-point component and having a core-sheath structure in the finer fibers contained in the coarse layer is in a range from 40% to 80% by weight.

The air cleaner element is an air cleaner element for an internal combustion engine of an automobile or for a fuel cell of an automobile, the air cleaner element including any one of the first to third non-woven filtration materials.

The non-woven filtration material according to the embodiment of the present disclosure can be used for, for example, filtering air to be supplied to an engine for an automobile. In particular, the non-woven filtration material according to the embodiment of the present disclosure is excellent in the performance of filtering particulate dust such as carbon dust. Accordingly, the non-woven filtration material according to the embodiment of the present disclosure has a high industrial utility value.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A non-woven filtration material comprising a multilayer structure having a density gradient, wherein
   the multilayer structure includes a coarse layer disposed at an upstream side of the non-woven filtration material and a dense layer disposed at a downstream side of the non-woven filtration material, bulk density of the coarse layer being lower than bulk density of the dense layer,
   the coarse layer and the dense layer are dry layers that are substantially neither impregnated nor coated with oil,
   the coarse layer contains 30% to 60% by weight of crimped conjugated fibers and contains 30% to 70% by weight of finer fibers,
   the crimped conjugated fibers have an average fiber diameter in a range from 15 µm to 45 µm,
   the finer fibers have an average fiber diameter that is in a range from 5 µm to 20 µm and smaller than the average fiber diameter of the crimped conjugated fibers,
   the crimped conjugated fibers have a coil-shaped or spiral-shaped three-dimensional structure in the coarse layer, and
   the crimped conjugated fibers and finer fibers are intermingled with each other and three-dimensionally arranged in the coarse layer.

2. The non-woven filtration material according to claim 1, wherein the finer fibers contained in the coarse layer contain finer fibers that have a core-sheath structure including a core and a sheath covering the core, a melting point of the core being higher than a melting point of the sheath, and
   the crimped conjugated fibers comprise co-extruded resins having different thermal shrinkage percentages in an eccentric structure or a side-by-side structure.

3. The non-woven filtration material according to claim 2, wherein in the finer fibers contained in the coarse layer, the finer fibers having the core-sheath structure have a blending ratio in a range from 40% to 80% by weight.

4. An air cleaner element for an internal combustion engine of an automobile or for a fuel cell of an automobile, the air cleaner element comprising the non-woven filtration material according to claim 1.

5. An air cleaner element for an internal combustion engine of an automobile or for a fuel cell of an automobile, the air cleaner element comprising the non-woven filtration material according to claim 2.

6. An air cleaner element for an internal combustion engine of an automobile or for a fuel cell of an automobile, the air cleaner element comprising the non-woven filtration material according to claim 3.

\* \* \* \* \*